(12) United States Patent
Kuwata et al.

(10) Patent No.: US 8,630,166 B2
(45) Date of Patent: Jan. 14, 2014

(54) RING NETWORK AND NETWORK RELAY DEVICE

(75) Inventors: Hitoshi Kuwata, Tsuchiura (JP); Koichiro Seto, Amimachi (JP)

(73) Assignee: Hitachi Cable, Ltd., Tokyo (JP)

( * ) Notice: Subject to any disclaimer, the term of this patent is extended or adjusted under 35 U.S.C. 154(b) by 440 days.

(21) Appl. No.: 12/659,347

(22) Filed: Mar. 4, 2010

(65) Prior Publication Data
US 2010/0265817 A1 Oct. 21, 2010

(30) Foreign Application Priority Data

Apr. 20, 2009 (JP) ................................. 2009-101849

(51) Int. Cl.
*H04J 1/16* (2006.01)

(52) U.S. Cl.
USPC ......... 370/222; 370/236.2; 370/244; 370/401

(58) Field of Classification Search
USPC .......... 370/216–252, 258, 400–406; 709/213, 709/226, 237, 238, 242; 714/48, 748, 799
See application file for complete search history.

(56) References Cited

U.S. PATENT DOCUMENTS

| | | | |
|---|---|---|---|
| 2006/0245351 A1* | 11/2006 | Pande et al. ................... | 370/216 |
| 2007/0165517 A1* | 7/2007 | Binetti et al. ................. | 370/222 |
| 2008/0126536 A1 | 5/2008 | Sakurai | |
| 2009/0268609 A1* | 10/2009 | Koch et al. .................... | 370/222 |
| 2010/0172245 A1* | 7/2010 | Sridhar et al. ................ | 370/242 |
| 2010/0226260 A1* | 9/2010 | Zinjuvadia et al. ........... | 370/248 |

FOREIGN PATENT DOCUMENTS

JP 2008-136013 6/2008

\* cited by examiner

*Primary Examiner* — Awet Haile
(74) *Attorney, Agent, or Firm* — McGinn Intellectual Property Law Group, PLLC

(57) ABSTRACT

A ring network with plural network relay devices connected in a ring shape includes first and second control ports to be transitioned into either a forwarding state that permits relaying information, or a blocking state that prohibits relaying information; and a ring protocol control unit for transmitting connection confirmation information indicative of communications being possible between the first and the second control port, from the first to the second control port, and from the second to the first control port at a predetermined time interval, or for, in the event that the first or the second control port does not receive the connection confirmation information from the second or the first control port, transmitting failure information indicative of communications being not possible between the first and the second control port, from the first to the second control port, or from the second to the first control port. The ring protocol control unit transitions the first control port into the blocking state when the first control port receives the failure information, or into the forwarding state when the first control port transmits the failure information. The ring protocol control unit transitions the second control port into the blocking state when the second control port receives the failure information, or into the forwarding state when the second control port transmits the failure information.

8 Claims, 8 Drawing Sheets

RING NETWORK AND NETWORK RELAY DEVICE

The present application is based on Japanese patent application No. 2009-101849 filed on Apr. 20, 2009, the entire contents of which are incorporated herein by reference.

BACKGROUND OF THE INVENTION

1. Field of the Invention

The present invention relates to a ring network and a network relay device. In particular, it relates to a ring network and a network relay device, capable of handling a failure caused.

2. Description of the Related Art

Conventionally, a monitor for constituting a portion of a ring network and monitoring the ring network is known that has a first and a second ring port for constituting the ring network, and which periodically transmits, from the first and the second ring port, a control frame for monitoring a state of the ring network, to determine whether or not the control frame transmitted from the first ring port is received by the second ring, and whether or not the control frame transmitted from the second ring port is received by the first ring, to thereby monitor a state of the ring network.

This monitor can determine whether or not to relay a user frame based on whether the monitor receives the periodically transmitted control frame. It can therefore realize high-speed path switching.

Refer to JP-A-2008-136013, for example.

However, the monitor disclosed by JP-A-2008-136013 causes a logical loop in the event of unidirectional breakage of transmission line in the network.

SUMMARY OF THE INVENTION

Accordingly, it is an object of the present invention to provide a ring network and a network relay device, which causes no logical loop in the event of unidirectional breakage of transmission line in the network.

(1) According to one embodiment of the invention, a ring network with plural network relay devices connected in a ring shape comprises:

first and second control ports to be transitioned into either a forwarding state that permits relaying information, or a blocking state that prohibits relaying information; and a ring protocol control unit for transmitting connection confirmation information indicative of communications being possible between the first and the second control port, from the first to the second control port, and from the second to the first control port at a predetermined time interval, or for, in the event that the first or the second control port does not receive the connection confirmation information from the second or the first control port, transmitting failure information indicative of communications being not possible between the first and the second control port, from the first to the second control port, or from the second to the first control port, wherein the ring protocol control unit transitions the first control port into the blocking state when the first control port receives the failure information, or into the forwarding state when the first control port transmits the failure information, and the ring protocol control unit transitions the second control port into the blocking state when the second control port receives the failure information, or into the forwarding state when the second control port transmits the failure information.

In the above embodiment (1), the following modifications and changes can be made.

(i) After a first period of time passing from a point of transmitting the failure information from the first or the second control port, the ring protocol control unit transitions the first or the second control port, from which the failure information has been transmitted, into the forwarding state, and after a second period of time shorter than the first period of time passing from a point of receiving the failure information in the first or the second control port, the ring protocol control unit transitions the first or the second control port, in which the failure information has been received, into the blocking state.

(ii) The ring network further comprises a frame generation unit for generating the connection confirmation information or the failure information to be transmitted by the first and the second control port, wherein during the first or the second control port receiving the connection confirmation information or the failure information, the ring protocol control unit causes the frame generation unit to generate the connection confirmation information, and transmit the connection confirmation information from the first or the second control port, in which the connection confirmation information or the failure information has been received, and when the first or the second control port does not receive the connection confirmation information and the failure information, the ring protocol control unit causes the frame generation unit to generate the failure information, and transmit the failure information from the first or the second control port, in which the connection confirmation information and the failure information have not been received.

(iii) The ring network further comprises a port control unit for transitioning the first and the second control port into either the forwarding state or the blocking state, wherein the ring protocol control unit controls the port control unit to transition the first and the second control port into either the forwarding state or the blocking state.

(iv) The plural network relay devices comprise first and second network relay devices, the first network relay device has the first control port, the second network relay device has the second control port, and when the first and the second network relay device receive the connection confirmation information, one of the first control port of the first network relay device and the second control port of the second network relay device is transitioned into the forwarding state, while the other is transitioned into the blocking state.

(v) One network relay device of the plural network relay devices has the first and the second control port, and when the one network relay device receives the connection confirmation information, one of the first and the second control port is transitioned into the forwarding state, while the other is transitioned into the blocking state.

(2) According to another embodiment of the invention, a network relay device to be used in a ring network comprises:

plural control ports to be transitioned into either a forwarding state that permits relaying information, or a blocking state that prohibits relaying information; and a ring protocol control unit for transmitting connection confirmation information indicative of communications being possible between one and another control port of the plural control ports, from the one to the another control port, and from the another to the one control port at a predetermined time interval, or for, in the event that the one or the another control port does not receive the connection confirmation information from the another or the one control port, transmitting failure information indicative of communications being not possible, from the one to the another control port, or from the another to the one control port, wherein the ring protocol control unit transitions the one control port into the blocking state when the one control port receives the failure information, or into the forwarding state when the one control port transmits the failure information, and the ring protocol control unit transitions the another control port into the blocking state when the another control port receives the failure information, or into the forwarding state when the another control port transmits the failure information.

In the above embodiment (2), the following modifications and changes can be made.

(vi) After a first period of time passing from a point of transmitting the failure information from the one or the another control port, the ring protocol control unit transitions the one or the another control port, from which the failure information has been transmitted, into the forwarding state, and after a second period of time shorter than the first period of time passing from a point of receiving the failure information in the one or the another control port, the ring protocol control unit transitions the one or the another control port, in which the failure information has been received, into the blocking state.

(3) According to another embodiment of the invention, a network relay device to be used in a ring network comprises:

one or more control ports to be transitioned into either a forwarding state that permits relaying information, or a blocking state that prohibits relaying information; and a ring protocol control unit for transmitting connection confirmation information indicative of communications being possible between one of the one or more control ports and another control port of another network relay device different from that network relay device, from the one to the another control port at a predetermined time interval, or for, in the event that the one control port does not receive the connection confirmation information from the another control port, transmitting failure information indicative of communications being not possible, from the one to the another control port, wherein the ring protocol control unit transitions the one control port into the forwarding state or the blocking state when the one control port receives the connection confirmation information from the another control port, and the ring protocol control unit transitions the one control port into the blocking state when the one control port receives the failure information, or into the forwarding state when the one control port transmits the failure information.

In the above embodiment (3), the following modifications and changes can be made.

(vii) After a first period of time passing from a point of transmitting the failure information from the one control port, the ring protocol control unit transitions the one control port, from which the failure information has been transmitted, into the forwarding state, and after a second period of time shorter than the first period of time passing from a point of receiving the failure information from the another control port in the one control port, the ring protocol control unit transitions the one control port, in which the failure information has been received, into the blocking state.

POINTS OF THE INVENTION

According to one embodiment of the invention, a network including network relay devices can transition the control ports into proper states, respectively, with proper timing even in the event of unidirectional breakage of transmission line in the network, therefore allowing information flow path switching without causing a logical loop in the network.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1:
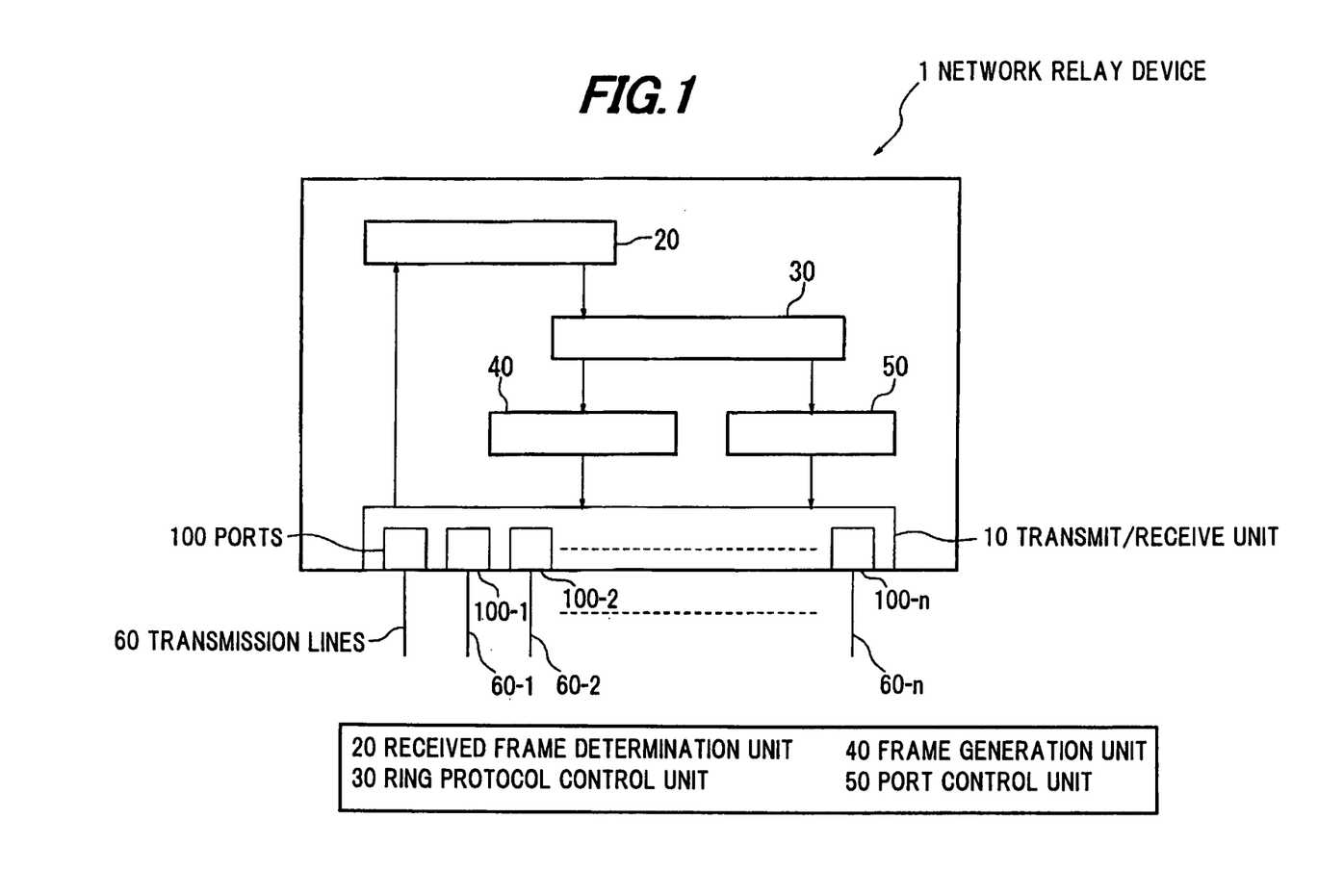
FIG. 1 is a block diagram showing a function and construction of a network relay device in a first embodiment according to the invention.

FIG. 1 shows one example of a block diagram showing a function and construction of a network relay device in the first embodiment according to the invention.

The network relay device 1 in the first embodiment is designed to address failure of transmission line, such as unidirectional breakage of transmission line. Specifically, the network relay device 1 in the first embodiment may be used in a ring network constructed of plural network relay devices connected in a ring shape. The ring-shaped connection of plural network relay devices enables redundancy in the ring network in case of failure in the ring network. The ring network may, in addition to conventional network relay devices, be provided with one or plural network relay devices 1 in the first embodiment. The network relay devices 1 included in the ring network have substantially the same function and configuration. Below is therefore described one network relay device 1.

Network Relay Device 1 Construction

The network relay device 1 in the first embodiment includes a transmit/receive unit 10 for receiving information (e.g. a frame) from an external network relay device and/or an external network, or providing information from the network relay device 1 to an external network relay device and/or an external network; a received frame determination unit 20 for referencing the information received in the transmit/receive unit 10 and determining whether or not specified information is contained in that information; a frame generation unit 40 for generating connection confirmation information or failure information based on the determined result of the received frame determination unit 20; a port control unit 50 for controlling the state of the transmit/receive unit 10; and a ring protocol control unit 30 for controlling the operation of the frame generation unit 40 and of the port control unit 50.

Although not shown, the network relay device 1 further includes a forwarding database (FDB) for storing path information, i.e. correspondences between MAC addresses and ports, a forwarding control unit for forwarding a specified frame between ports, and a central control unit for controlling the forwarding control unit and operating software.

Transmit/Receive Unit 10

The transmit/receive unit 10 has plural ports (e.g. port 100, port 100-1, port 100-2, ..., port 100-n, where n is a positive integer) communicably connected to an external network relay device and/or an external network. The plural ports are connected to transmission lines, respectively, for transmitting/receiving information between them and the external network relay device and/or the external network. Specifically, the port 100 is connected to a transmission line 60, and the port 100-1 is connected to a transmission line 60-1. The ports 100-2-100-n are likewise connected to transmission lines 60-2-60-n, respectively. Also, each of the ports, which serve as plural control ports, is provided to be able to be transitioned into either a forwarding state that permits relaying information, or a blocking state that prohibits relaying information.

Here, in the first embodiment, the plural transmission lines each are constructed from an optical fiber, for example, and configured to include at least two transmission lines. That is to say, although for convenience of description, each transmission line is depicted as being one line in FIG. 1, the plural transmission lines each are configured to include a two-way (i.e. two directions of transmitting and receiving) transmission line, to allow full duplex communications between the external network relay device and/or the external network and the network relay device 1.

The transmit/receive unit 10 provides the information received from the external network relay device and/or the external network, from each of the plural ports to the received frame determination unit 20. Also, the transmit/receive unit 10 provides the information from the frame generation unit 40 or the forwarding control unit, from a specified port to the specified external network relay device and/or the external network. Further, the transmit/receive unit 10 is controlled by the port control unit 50, to transition each of the plural ports into either a forwarding state, or a blocking state.

Received Frame Determination Unit 20

The received frame determination unit 20 references the contents of the information received from the transmit/receive unit 10 and determines whether or not connection confirmation information or failure information is contained in that information. The received frame determination unit 20 provides a determined result to the ring protocol control unit 30. Specifically, the received frame determination unit 20 provides to the ring protocol control unit 30 the determined result information indicative of having received the connection confirmation information or the failure information, or the determined result information indicative of having not received the connection confirmation information or the failure information.

Here, the connection confirmation information refers to, for example, frames to be transmitted at a predetermined time interval (e.g. a few milliseconds), for monitoring whether or not communications are possible between one port of network relay device 1 and another port of the external network relay device, and for indicating that communications are possible. Also, the failure information refers to, for example, frames for indicating that communications are not possible in the event that one port of network relay device 1 receives no connection confirmation information from another port of the external network relay device, or another port of the external network relay device receive no connection confirmation information from network relay device 1.

For example, the connection confirmation information frame may use a continuity check message (CCM) frame specified in ITU-T Y. 1731 and IEEE802.1ag. Also, the failure information frame may use, for example, a remote defect indication (RDI) frame specified in ITU-T Y. 1731. The received frame determination unit 20 references an Ethernet type and/or an operation code of the information frame received from the transmit/receive unit 10 and thereby determines whether or not that information frame is the connection confirmation information frame or the failure information frame.

Ring Protocol Control Unit 30

The ring protocol control unit 30 controls the operation of the frame generation unit 40 and of the port control unit 50, based on the information indicative of a determined result received from the received frame determination unit 20. That is, the ring protocol control unit 30 controls the frame generation unit 40 based on the determined result, to cause the frame generation unit 40 to generate the connection confirmation information or the failure information. Also, the ring protocol control unit 30 controls the port control unit 50, based on the determined result, to transition a specified port into either a forwarding state, or a blocking state.

Specifically, the ring protocol control unit 30 causes the frame generation unit 40 to generate the connection confirmation information, based on the determined result. The frame generation unit 40 transmits the generated connection confirmation information from one port of network relay device 1 to another port of the external network relay device. The external network relay device can also likewise transmit the connection confirmation information from another port to one port of network relay device 1.

Also, the ring protocol control unit 30 causes the frame generation unit 40 to generate the failure information, based on the determined result. The frame generation unit 40 transmits the generated failure information from one port of network relay device 1 to another port of the external network relay device. The external network relay device can also likewise transmit the failure information from another port to one port of network relay device 1.

Frame Generation Unit 40

The frame generation unit 40 is controlled by the ring protocol control unit 30, to generate the connection confirmation information or the failure information. The frame generation unit 40 provides the generated connection confirmation information or failure information to the transmit/receive unit 10. The transmit/receive unit 10 transmits the connection confirmation information or failure information received from the frame generation unit 40 to a specified port.

Port Control Unit 50

The port control unit 50 is controlled by the ring protocol control unit 30, to control the states of the ports constituting the ring network. That is, the port control unit 50 is controlled by the ring protocol control unit 30, to transition each of the plural ports of the transmit/receive unit 10 into either a forwarding state, or a blocking state. Also, the port control unit 50 can maintain each of the plural ports in either a forwarding state, or a blocking state.

Operation of Ring Protocol Control Unit 30

When one port receives failure information from an external network relay device, the ring protocol control unit 30 controls the port control unit 50 to transition the one port into a blocking state. When failure information is transmitted from one port to an external network relay device, the ring protocol control unit 30 controls the port control unit 50 to transition the one port into a forwarding state. Also, a ring protocol control unit of an external network relay device can control a port control unit of the external network relay device to transition another port into a blocking state when the another port of the external network relay device receives failure information from network relay device 1. The ring protocol control unit of the external network relay device can also control the port control unit to transition another port into a forwarding state when failure information is transmitted from the another port to network relay device 1.

Operation of Network Relay Device 1

Below is described operation of network relay device 1, showing a construction of a network.

Figure 2:
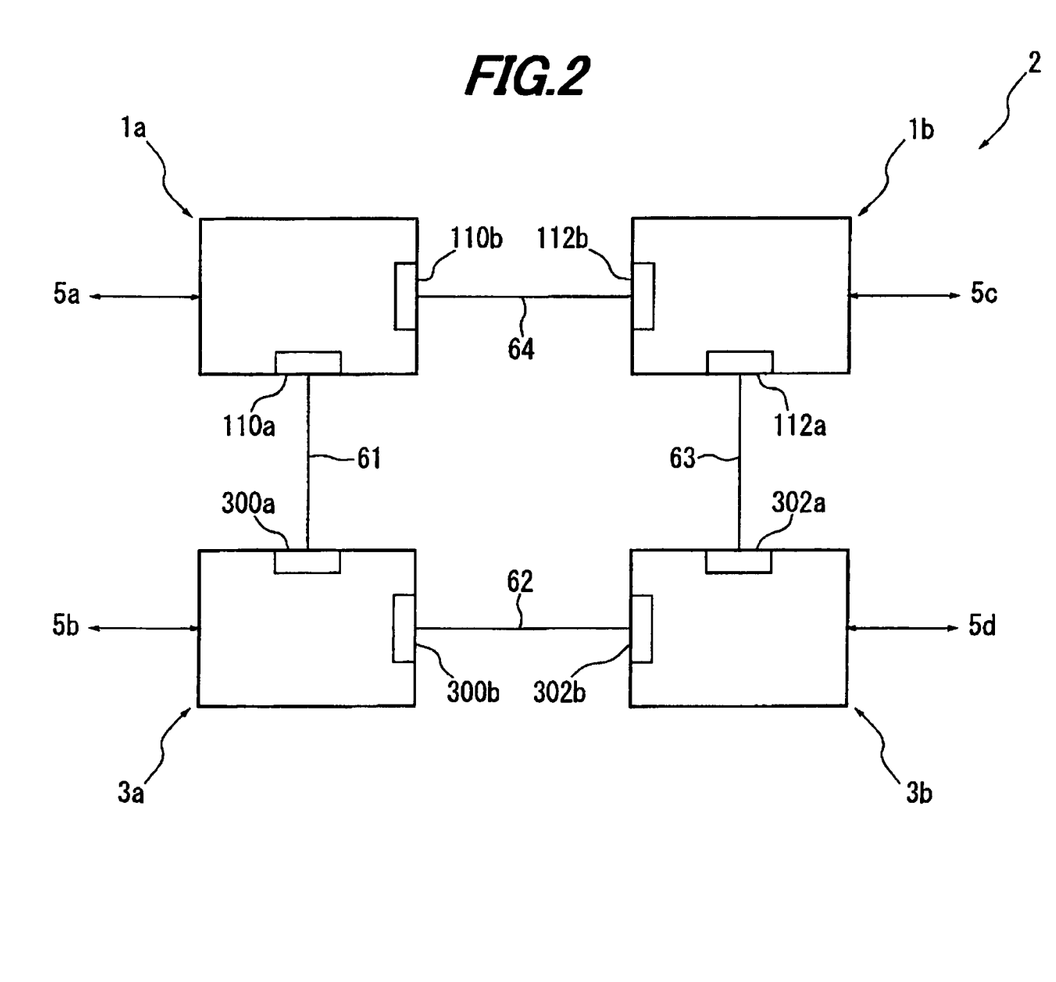
FIG. 2 is a diagram showing a network in the first embodiment according to the invention.

FIG. 2 shows one example of a network in the first embodiment according to the invention.

Network 2 in the first embodiment is a ring network, and includes plural network relay devices. Specifically, the network 2 includes two conventional network relay devices (i.e. network relay devices 3a and 3b), and two network relay devices in the first embodiment (i.e. network relay devices 1a and 1b). All network relay devices of the network 2 may also be network relay devices 1 in the first embodiment. Also, the number of network relay devices in the first embodiment and the number of conventional network relay devices included in the network 2 are each not limited to two, but may be one or more than two.

Network 2 Construction

The network 2 comprises network relay devices 1a and 1b in the first embodiment, and conventional network relay devices 3a and 3b. A port 110a of the network relay device 1a is connected to a port 300a of the network relay device 3a by a transmission line 61. Here, the port 110a, which serves as one control port (or a first control port) of plural ports provided in transmit/receive unit 10, is referred to as "master control port" in this embodiment.

Also, a port 300b of the network relay device 3a is connected to a port 302b of the network relay device 3b by a transmission line 62. A port 302a of the network relay device 3b is connected to a port 112a of the network relay device 1b by a transmission line 63. Also, a port 112b of the network relay device 1b is connected to a port 110b of the network relay device 1a by a transmission line 64. Here, the port 112a, which serves as another control port (or a second control port) of the plural ports provided in transmit/receive unit 10, is referred to as "slave control port" in this embodiment. That is, in this embodiment, a port provided in one network relay device is set as "a master control port," and a port provided in another network relay device different from the one network relay device is set as "a slave control port."

The network relay device 1a is connected to an external network 5a. The network relay device 1b is connected to an external network 5c. The network relay device 3a is connected to an external network 5b. The network relay device 3b is connected to an external network 5d.

In a normal state (i.e. with no failure occurring in network 2), the slave control port is set into a blocking state. This allows the network 2 to form no logical loop, although forming a physical loop. Accordingly, the information from the network relay devices 3a and 3b is provided through the network relay device 1a to external network 5a.

In the normal state, the network relay device 1a regularly provides connection confirmation information from its master control port to the slave control port. That connection confirmation information is provided to the port 112a via the transmission lines 61, 62, and 63. Likewise, the network relay device 1b regularly provides connection confirmation information from its slave control port to the master control port. That connection confirmation information is provided to the port 110a via the transmission lines 63, 62, and 61.

Operation of Ring Protocol Control Unit 30

In this network 2, respective ring protocol control units 30 of the network relay devices 1a and 1b are operated according to kinds of information received in the network relay devices 1 from outside. The network relay devices 1a and 1b have the same function and configuration, except that one port of the network relay device 1b is set as a slave control port. Therefore, the operation of the network relay device 1a is mainly described below.

A Case of Network Relay Device 1a Receiving Connection Confirmation Information When the determined result of received frame determination unit 20 of the network relay device 1a is indicative of connection confirmation information (i.e. connection confirmation information from the slave control port) being contained in information received from transmit/receive unit 10, the ring protocol control unit 30 determines that no failure has occurred in transmission lines. The ring protocol control unit 30 then controls frame generation unit 40, to cause the frame generation unit 40 to generate connection confirmation information at a predetermined time interval (i.e. at a regular interval). The ring protocol control unit 30 then regularly transmits the generated connection confirmation information from the transmit/receive unit 10 to the external network relay device 1b.

Further, the ring protocol control unit 30 controls port control unit 50 to transition the master control port into a forwarding state, or when in a forwarding state, maintain the master control port in the forwarding state. Also, when the network relay device 1b receives the connection confirmation information, the ring protocol control unit 30 of the network relay device 1b controls its port control unit 50 to transition the slave control port into a blocking state, or when in a blocking state, maintain the slave control port in the blocking state.

A Case of Network Relay Device 1a Receiving No Connection Confirmation Information or Failure Information When the determined result of received frame determination unit 20 of the network relay device 1a is indicative of no connection confirmation information or failure information being contained in information received from transmit/receive unit 10, or when it is indicative of no information being received in the transmit/receive unit 10, the ring protocol control unit 30 determines that a failure has occurred in transmission lines. That is, the ring protocol control unit 30 determines that a failure has occurred in transmission lines in the direction from the network relay device 1b to 1a.

The ring protocol control unit 30 then controls frame generation unit 40, to cause the frame generation unit 40 to generate failure information at a predetermined time interval (i.e. at a regular interval). The ring protocol control unit 30 then regularly transmits the generated failure information from the transmit/receive unit 10 to the external network relay device 1b.

Further, the ring protocol control unit 30 controls port control unit 50 to, after a first predetermined period of time passing from a point of transmitting a failure information, transition the master control port into a forwarding state, or when in a forwarding state, maintain the master control port in the forwarding state. Also, when the network relay device 1b transmits failure information, the ring protocol control unit 30 of the network relay device 1b controls its port control unit 50 to maintain the slave control port in the blocking state for a predetermined period of time. After the predetermined period of time passing, the ring protocol control unit 30 controls the port control unit 50 to transition the slave control port from the blocking state into a forwarding state. The predetermined period of time is set to be longer than the period of time required for the failure information transmitted from the network relay device 1b to 1a to arrive at the network relay device 1a.

A Case of Network Relay Device 1a Receiving Failure Information

When the determined result of received frame determination unit 20 of the network relay device 1a is indicative of failure information being contained in information received from transmit/receive unit 10, the ring protocol control unit 30 determines that a failure has occurred in transmission lines. That is, the ring protocol control unit 30 determines that a failure has occurred in transmission lines in the direction from the network relay device 1a to 1b. The ring protocol control unit 30 then controls frame generation unit 40, to cause the frame generation unit 40 to generate connection confirmation information at a regular interval. The ring protocol control unit 30 then controls the frame generation unit 40, to regularly transmit the generated connection confirmation information from the transmit/receive unit 10 to the external network relay device 1b. It should be noted, however, that, in that case, that connection confirmation information does not arrive at the network relay device 1b.

Further, when a second period of time shorter than the first predetermined period of time passes from a point of receiving a failure information, the ring protocol control unit 30 controls port control unit 50 to transition the master control port from the forwarding state into a blocking state. Here, the second period of time is preferred to be set virtually at zero. That is, at the failure information receiving point, the ring protocol control unit 30 immediately controls the port control unit 50 to transition the master control port into a blocking state.

When the network relay device 1b receives failure information, because the slave control port is in the blocking state, the ring protocol control unit 30 of the network relay device 1b controls its port control unit 50 to maintain the slave control port in the blocking state.

Figure 3A:
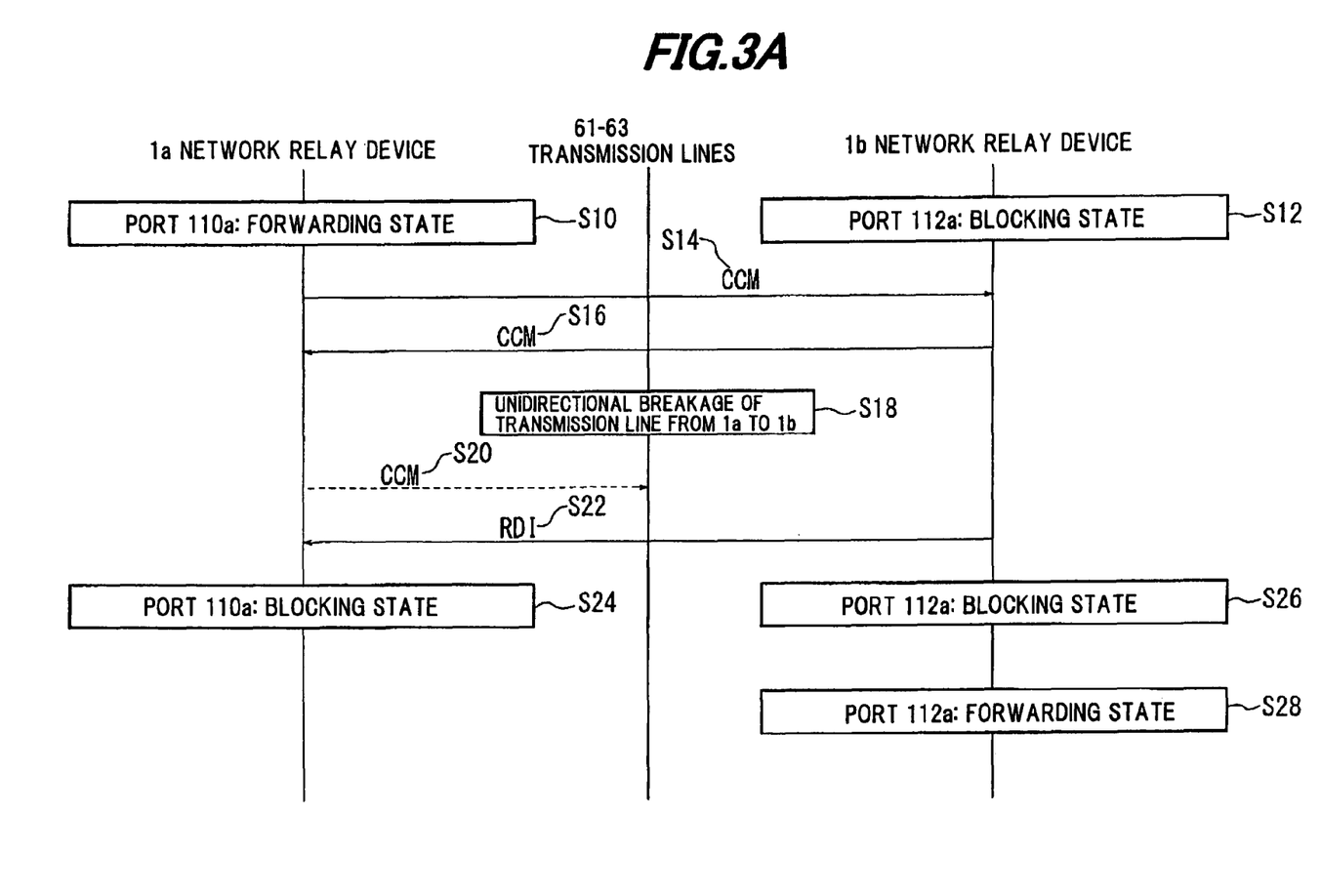
FIG. 3A is a diagram showing flows of operation of the network in the event of unidirectional breakage of transmission line in the network shown in FIG. 2.

FIG. 3A shows one example of flows of operation of the network in the event of unidirectional breakage of transmission line in the network shown in FIG. 2.

Specifically, FIG. 3A shows one example of flows of operation of the network 2 shown in FIG. 2 in the event of unidirectional breakage of transmission line (e.g. transmission line 62) in the direction from the network relay device 1a to 1b.

First, a port 110a (in FIGS. 3A and 3B, referred to as "the master control port") of the network relay device 1a is set into a forwarding state (step S10). Also, a port 112a (in FIGS. 3A and 3B, referred to as "the slave control port") of the network relay device 1b is set into a blocking state (step S10). This allows the network 2 to be configured as a ring network with no logical loop.

The network relay device 1a regularly transmits connection confirmation information (herein, referred to as "CCM") to the network relay device 1b (S14). This CCM arrives at the slave control port via transmission lines 61 to 63. In that case, the CCM is transmitted through each network relay device 3a and 3b. Likewise, the network relay device 1b regularly transmits CCM to the network relay device 1a (S16).

It is then assumed that a cable breakage occurs between the network relay devices 1a and 1b, for example, in transmission line 62 in the direction from the network relay device 1a to 1b (S18: unidirectional breakage of transmission line). In this case, the CCM transmitted from the network relay device 1a to 1b does not arrive at the network relay device 1b (S20).

Received frame determination unit 20 of the network relay device 1b detects that no CCM from the network relay device 1a is received in the slave control port. Based on this, ring protocol control unit 30 causes frame generation unit 40 to generate failure information (herein, referred to as "RDI") and transmit the generated RDI from the slave control port. The frame generation unit 40 generates the RDI and transmits it from the slave control port of transmit/receive unit 10 to the master control port of the network relay device 1a (S22). Also, the ring protocol control unit 30 of the network relay device 1b controls its port control unit 50 to maintain the slave control port 112a in the blocking state for a predetermined period of time (S26).

On the other hand, the master control port of the network relay device 1a receives the RDI from the slave control port. Based on received frame determination unit 20 of the network relay device 1a determining that it has received the RDI, ring protocol control unit 30 of the network relay device 1a controls its port control unit 50 to immediately transition the master control port from the forwarding state into a blocking state (S24). After a predetermined period of time passing, the ring protocol control unit 30 of the network relay device 1b controls its port control unit 50 to transition the slave control port from the blocking state into a forwarding state (S28).

Figure 3B:
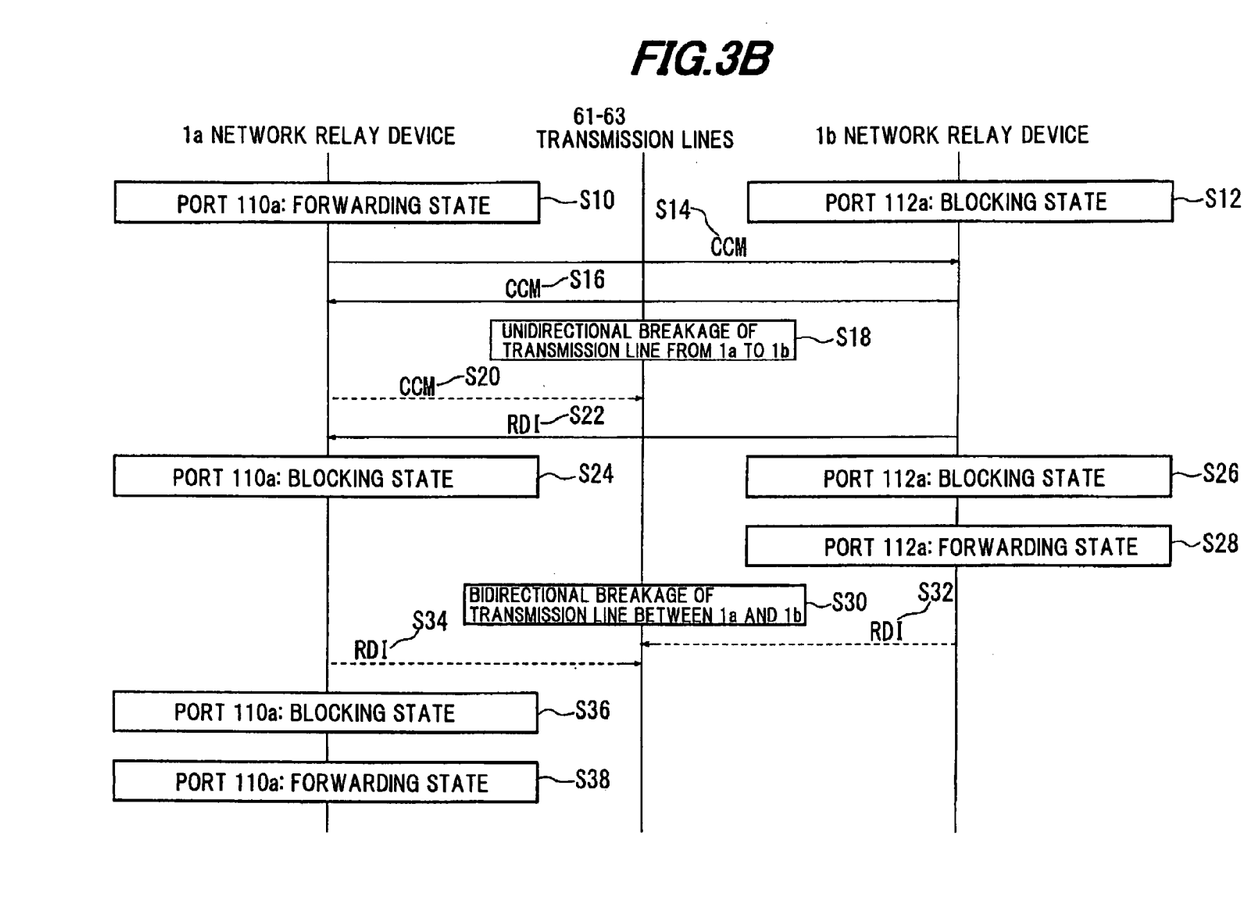
FIG. 3B is a diagram showing flows of operation of the network in the event of bidirectional breakage of transmission line in the network shown in FIG. 2.

FIG. 3B shows one example of flows of operation of the network in the event of bidirectional breakage of transmission line in the network shown in FIG. 2.

Specifically, FIG. 3B shows one example of flows of operation of the network 2 shown in FIG. 2 in the event of bidirectional breakage of transmission line: unidirectional breakage of transmission line (e.g. transmission line 62) in the direction from the network relay device 1a to 1b, and a subsequent unidirectional breakage of transmission line (e.g. transmission line 62) in the direction from the network relay device 1b to 1a as well. Herein, each step of S10 to S28 is omitted because of the same as the above descriptions of FIG. 3A.

First, it is assumed that a cable breakage occurs between the network relay devices 1a and 1b, for example, in transmission line 62 in the direction from the network relay device 1b to 1a (S30: bidirectional breakage of transmission line). In this case, RDI transmitted from the network relay device 1b to 1a does not arrive at the network relay device 1a (S32).

Based on received frame determination unit 20 of the network relay device 1a determining that the RDI from the slave control port does not arrive at the master control port, ring protocol control unit 30 of the network relay device 1a causes its frame generation unit 40 to generate RDI. The frame generation unit 40 generates the RDI and transmits it from the master control port of transmit/receive unit 10 to the slave control port of the network relay device 1b (S34). This RDI does not arrive at the slave control port of the network relay device 1b.

Also, the ring protocol control unit 30 of the network relay device 1a controls its port control unit 50 to maintain the master control port 110a in the blocking state for a predetermined period of time from a point of the RDI being transmitted from the master control port 110a (S36). After the predetermined period of time passing, the ring protocol control unit 30 of the network relay device 1a controls its port control unit 50 to transition the master control port into a forwarding state (S28).

Figure 4:
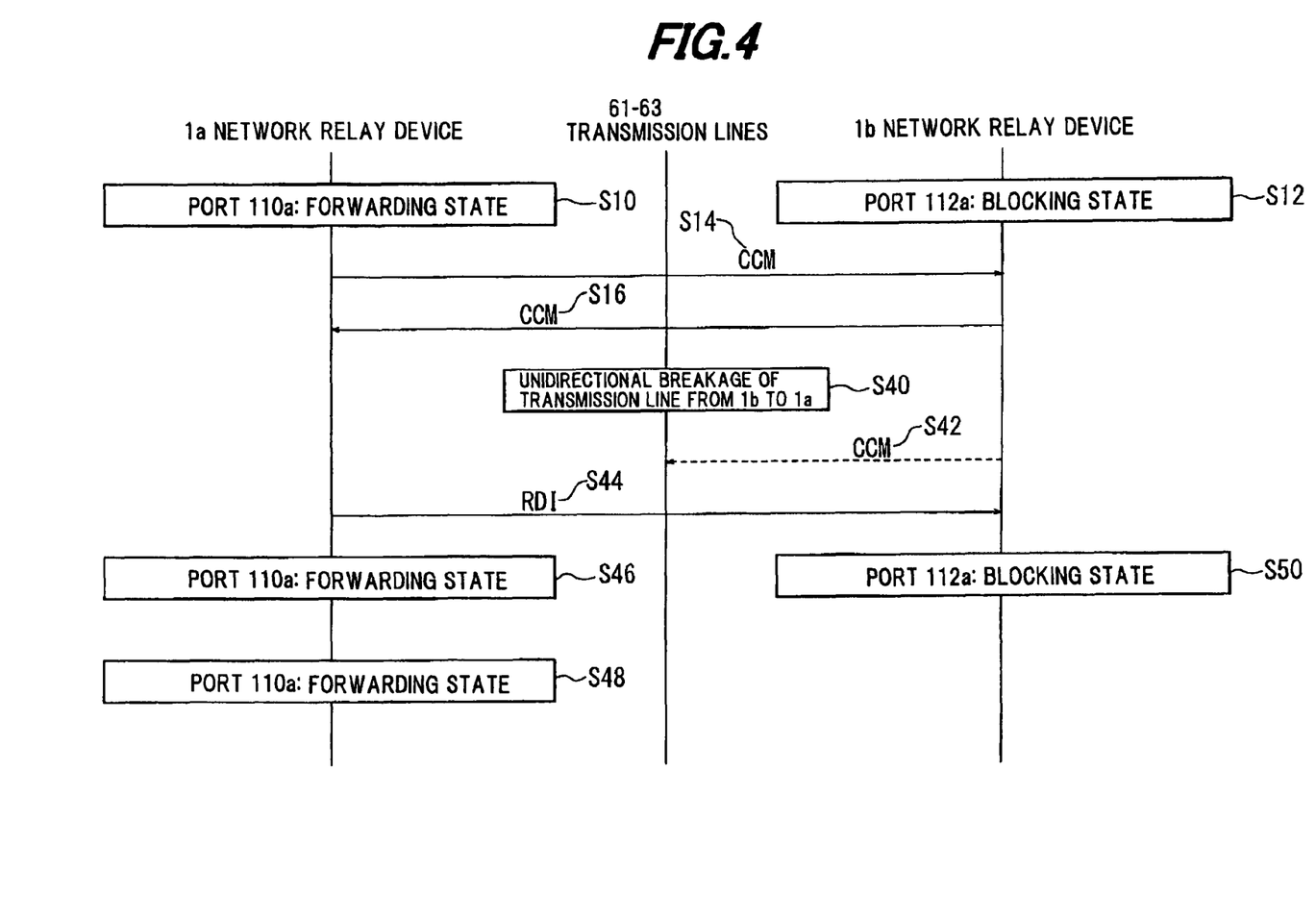
FIG. 4 is a diagram showing flows of operation of the network in the event of unidirectional breakage of transmission line in the network shown in FIG. 2.

FIG. 4 shows one example of flows of operation of the network in the event of unidirectional breakage of transmission line in the network shown in FIG. 2.

Specifically, FIG. 4 shows one example of flows of operation of the network 2 shown in FIG. 2 in the event of unidirectional breakage of transmission line (e.g. transmission line 62) in the direction from the network relay device 1b to 1a. Herein, each step of S10 to S16 is omitted because of the same as the above descriptions of FIG. 3A.

First, it is assumed that a cable breakage occurs between the network relay devices 1a and 1b, for example, in transmission line 62 in the direction from the network relay device 1b to 1a (S40: unidirectional breakage of transmission line). In this case, CCM transmitted from the network relay device 1b to 1a does not arrive at the network relay device 1a (S42).

Based on received frame determination unit 20 of the network relay device 1a determining that the CCM from the slave control port does not arrive at the master control port, ring protocol control unit 30 of the network relay device 1a causes its frame generation unit 40 to generate RDI. The frame generation unit 40 generates the RDI and transmits it from the master control port of transmit/receive unit 10 to the slave control port of the network relay device 1b (S44). Also, the ring protocol control unit 30 of the network relay device 1a controls its port control unit 50 to maintain the master control port 110a in the forwarding state for a predetermined period of time from a point of the RDI being transmitted from the master control port 110a (S46).

Based on received frame determination unit 20 of the network relay device 1b determining that the RDI from the master control port arrives at the slave control port, ring protocol control unit 30 of the network relay device 1b controls its port control unit 50 to maintain the slave control port 112a in the blocking state (S50). On the other hand, after the predetermined period of time passing, the ring protocol control unit 30 of the network relay device 1a controls its port control unit 50 to maintain the master control port 110a in the forwarding state (S48).

Modification to the First Embodiment

Although in network 2 in the first embodiment, during normal, the master control port is set into a forwarding state and the slave control port is set into a blocking state, the port states may be set for each VLAN in modification to the first embodiment. For example, in one VLAN, a master control port is set into a forwarding state and a slave control port is set into a blocking state, while in another VLAN, a master control port is set into a blocking state and a slave control port is set into a forwarding state. In this case, during cable breakage occurring in a network for each VLAN, operation is implemented in the same manner as the operation in network 2 in the first embodiment.

Comparative Example

Figure 5:
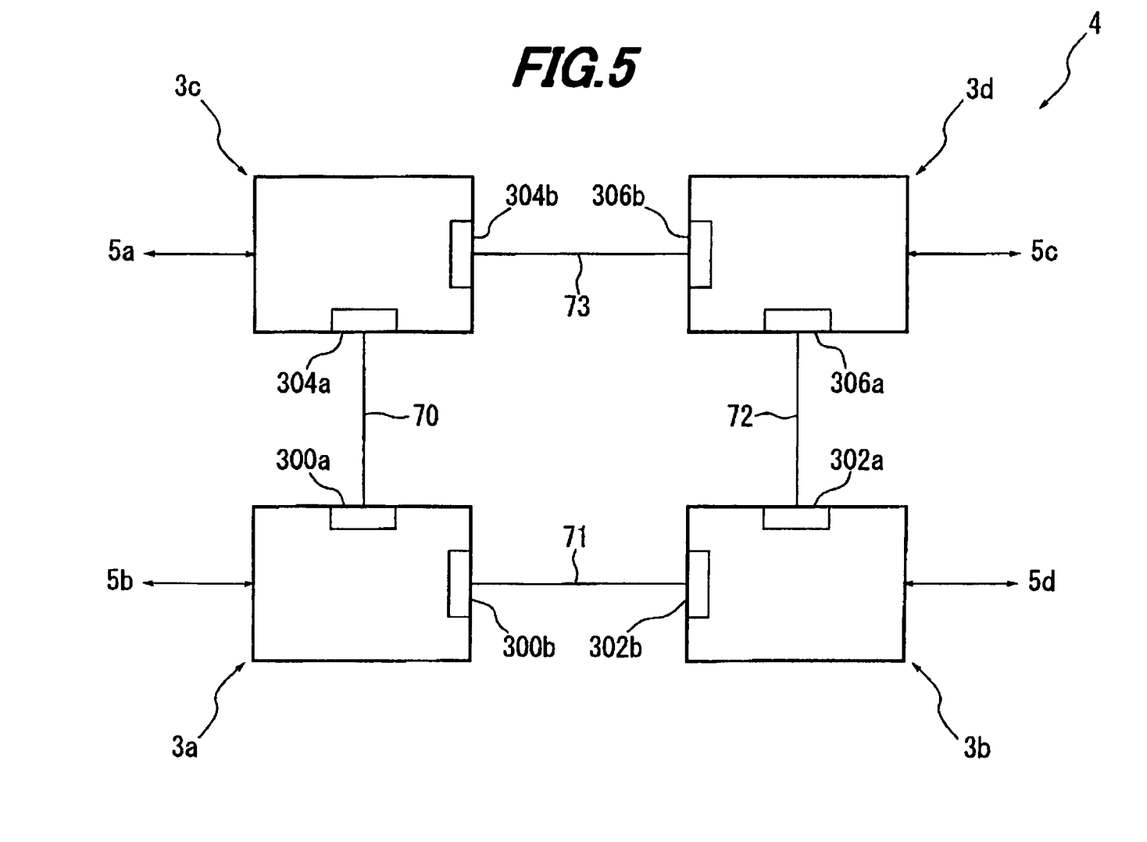
FIG. 5 is a diagram showing a construction of a network in a comparative example.

FIG. 5 shows a construction of a network in a comparative example.

Network 4 in the comparative example is a ring network, and includes plural network relay devices. Specifically, the network 4 includes four conventional network relay devices (i.e. network relay devices 3a to 3d). The number of conventional network relay devices included in the network 4 is not limited to four.

In the network 4, a port 304a of the network relay device 3c is connected to a port 300a of the network relay device 3a by a transmission line 70. Here, one port 304a of plural ports provided in transmit/receive unit 10, is taken as "the master control port" in the comparative example.

Also, a port 300b of the network relay device 3a is connected to a port 302b of the network relay device 3b by a transmission line 71. A port 302a of the network relay device 3b is connected to a port 306a of the network relay device 3d by a transmission line 72. Also, a port 306b of the network relay device 3d is connected to a port 304b of the network relay device 3c by a transmission line 73. Here, another port 306a of the plural ports provided in transmit/receive unit 10, is taken as "the slave control port" in the comparative example.

In a normal state, the slave control port is set into a blocking state. This allows the network 4 to form no logical loop, although forming a physical loop. Accordingly, the information from the network relay devices 3a and 3b is provided through the network relay device 3c to external network 5a. In the normal state, the network relay device 3c regularly provides connection confirmation information from its master control port to the slave control port. Likewise, the network relay device 3d regularly provides connection confirmation information from its slave control port to the master control port. These connection confirmation information allow connection confirmation between the network relay devices 3c and 3d.

Figure 6:
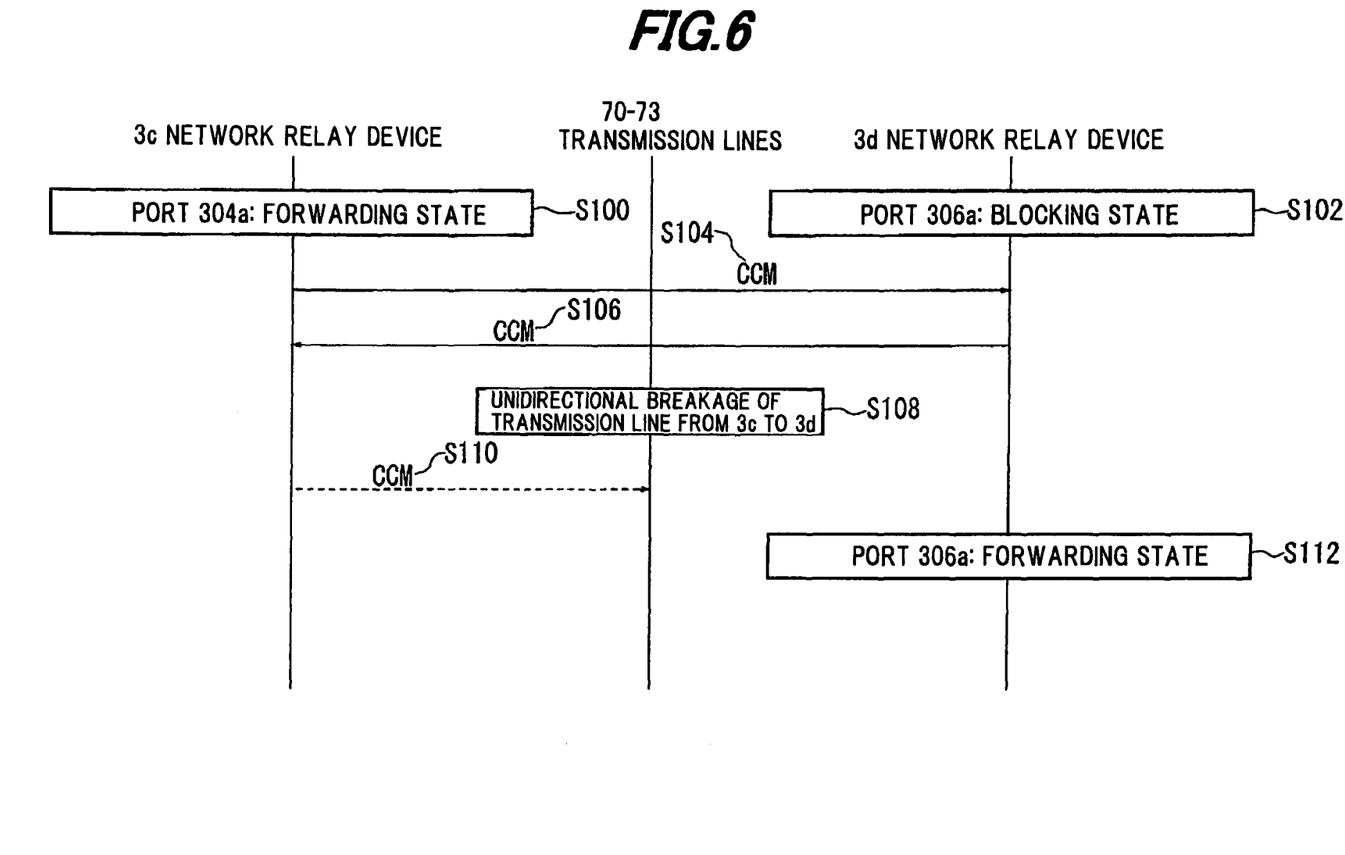
FIG. 6 is a diagram showing flows of operation of the network in the event of a failure in the network in the comparative example.

FIG. 6 shows one example of flows of operation of the network in the event of a failure in the network in the comparative example.

Specifically, FIG. 6 shows one example of flows of operation of the network 4 in the comparative example shown in FIG. 5 in the event of unidirectional breakage of transmission line (e.g. transmission line 71) in the direction from the network relay device 3c to 3d.

First, the master control port of the network relay device 3c is set into a forwarding state (step S100). Also, the slave control port of the network relay device 3d is set into a blocking state (step S102). The network relay device 3c regularly transmits CCM to the network relay device 3d (S104). Likewise, the network relay device 3d regularly transmits CCM to the network relay device 3c (S106).

It is then assumed that a cable breakage occurs between the network relay devices 3c and 3d, for example, in transmission line 71 in the direction from the network relay device 3c to 3d (S108: unidirectional breakage of transmission line). In this case, the CCM transmitted from the network relay device 3c to 3d does not arrive at the network relay device 3d (S110). The network relay device 3d detects that no CCM from the network relay device 3c is received in the slave control port. Based on this, the network relay device 3d transitions the slave control port from the blocking state into a forwarding state.

In that case, no failure occurs in the transmission lines in the direction from the network relay device 3d to 3c, and both the master control port and the slave control port are in the forwarding state, and a loop is therefore caused in the ring network of network relay devices 3a to 3d.

Advantages of the First Embodiment

The network 2 including network relay devices 1 in the first embodiment can transition the master control port and the slave control port into proper states, respectively, with proper timing even in the event of unidirectional breakage of transmission line in the network 2, therefore allowing information flow path switching without causing a logical loop in the network 2.

Also, the network 2 in the first embodiment allows only network relay devices with master and slave control ports to have the function explained in the first embodiment, thereby being able to prevent a loop from occurring in the event of unidirectional breakage of transmission line in the network. Network relay devices with no master and slave control ports may use conventional network relay devices. This allows the network 2 including network relay devices 1 in the first embodiment to provide a low-cost ring network without causing a loop during unidirectional breakage of transmission line.

Second Embodiment

Figure 7:
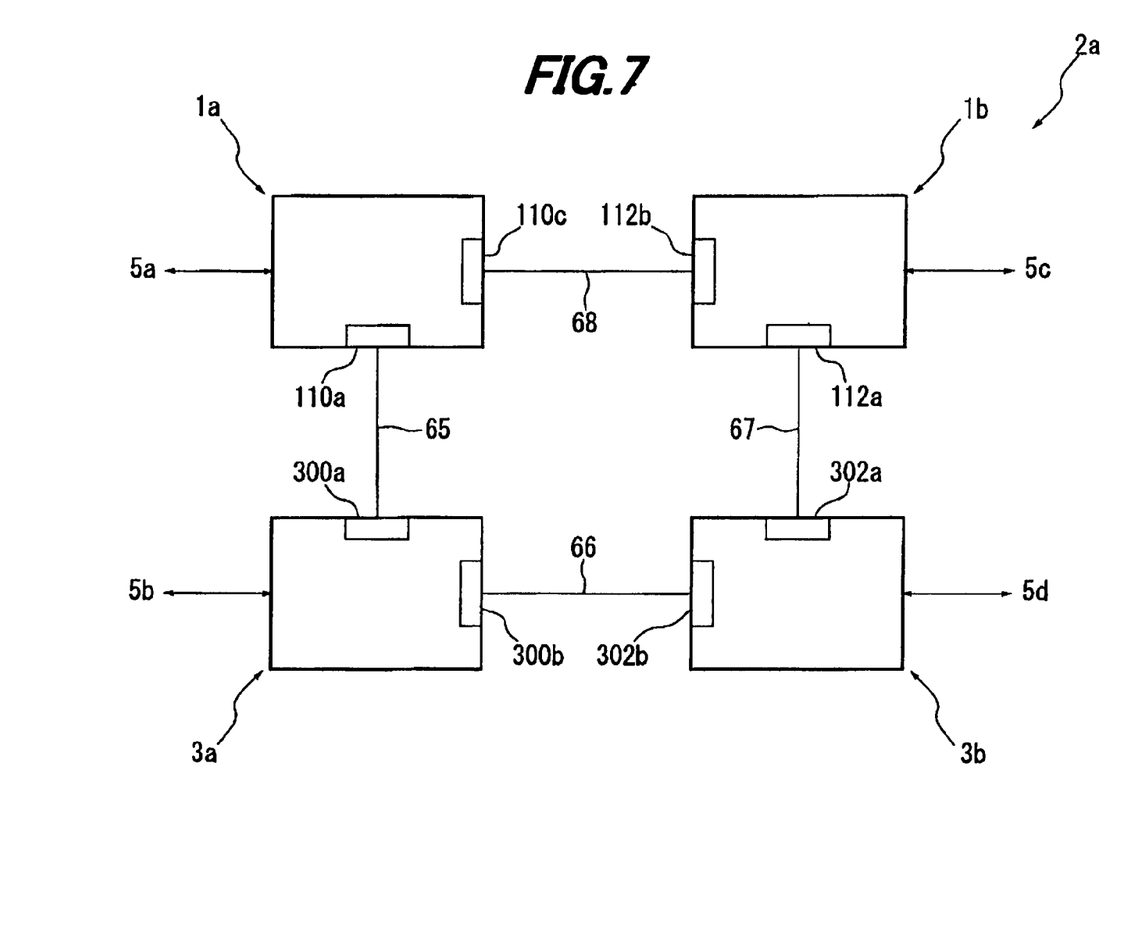
FIG. 7 is a diagram showing a construction of a network in a second embodiment according to the invention.

FIG. 7 shows one example of a construction of a network in the second embodiment according to the invention.

Network 2a in the second embodiment has substantially the same function and configuration as network 2 in the first embodiment, except that network relay device 1a is provided with a port 110a as a master control port and a port 110c as a slave control port. Therefore, its details are omitted, excluding the difference.

The network 2a in the second embodiment includes plural network relay devices. Specifically, the network 2a includes two conventional network relay devices (i.e. network relay devices 3a and 3b), and two network relay devices in the first embodiment (i.e. network relay devices 1a and 1b). The network relay device 1a has the master control port and the slave control port. That is, the network 2a in the second embodiment is different from network 2 in the first embodiment in that one network relay device 1a has both the master control port and the slave control port.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A ring network comprising:
   plural network relay devices connected in a ring shape,
   wherein the plural network relay devices comprise a first network relay device and a second network relay device, the first network relay device comprises a first control port, the second network relay device comprises a second control port;
   wherein the first control port and the second control port to be transitioned into either a forwarding state that permits relaying information, or a blocking state that prohibits relaying information; and
   wherein the first network relay device comprises a first ring protocol control unit for transmitting a first connection confirmation information generated by the first network relay device indicative of communications being possible between the first control port and the second control port from the first control port to the second control port at a first predetermined time interval, and
   wherein the second network relay device comprises a second ring protocol control unit for transmitting a second connection confirmation information generated by the second network relay device from the second control port to the first control port at a second predetermined time interval, and
   wherein, in an event that the first control port does not receive the second connection confirmation information, the first ring protocol control unit transmits a first failure information indicative of communications being not possible between the first control port and the second control port, from the first control port to the second control port, and,
   wherein, in an event that the second control port does not receive the first connection confirmation information, the second ring protocol control unit transmits a second failure information from the second control port to the first control port,
   wherein the first ring protocol control unit transitions the first control port into the blocking state when the first control port receives the second failure information, and into the forwarding state when the first control port transmits the first failure information, and
   wherein the second ring protocol control unit transitions the second control port into the blocking state when the second control port receives the first failure information, and into the forwarding state when the second control port transmits the second failure information;
   wherein after a first predetermined period of time passing from a point of transmitting the first failure information from the first control port, the first ring protocol control unit transitions the first control port, from which the first failure information has been transmitted, into the forwarding state, and wherein after a second period of time shorter than the first predetermined period of time passing from a point of receiving the first failure information in the second control port, the second ring protocol control unit transitions the second control port, in which the first failure information has been received, into the blocking state;
   wherein said transmitting the first failure information from the first control port to the second control port and the second failure information from the second control port to the first control port includes, transmitting the first failure information and the second failure information via at least one another network relay device.

2. The ring network according to claim 1, wherein the first network relay device further comprises a first frame generation unit for generating the first connection confirmation information or the first failure information to be transmitted by the first control port
   wherein during the first or the second control port receiving the second connection confirmation information or the second failure information, the first ring protocol control unit causes the first frame generation unit to generate the first connection confirmation information, and transmit the first connection confirmation information from the first control port,
   wherein, when the first control port does not receive the second connection confirmation information and the second failure information, the first ring protocol control unit causes the first frame generation unit to generate the first failure information, and transmits the first failure information from the first control port, and
   wherein the second network relay device further comprises a second frame generation unit for generating the second connection confirmation information or the second failure information to be transmitted by the second control port, wherein during the second control port receiving the first connection confirmation information or the first failure information, the second ring protocol control unit causes the second frame generation unit to generate the second connection confirmation information, and transmits the second connection confirmation information from the second control port, and wherein, when the second control port does not receive the first connection confirmation information and the first failure information, the second ring protocol control unit causes the second frame generation unit to generate the second failure information, and transmits the second failure information from the second control port.

3. The ring network according to claim 2, wherein the first network relay device further comprises a first port control unit for transitioning the first control port into either the forwarding state or the blocking state, wherein the first ring protocol control unit controls the first port control unit to transition the first control port into either the forwarding state or the blocking state, and wherein the second network relay device further comprises a second port control unit for transitioning the second control port into either the forwarding state or the blocking state, wherein the second ring protocol control unit controls the second port control unit to transition the second control port into either the forwarding state or the blocking state.

4. A network relay device to be used in a ring network, said network relay device comprising:

plurality of physical sports;

a first control port and a second control port to be transitioned into either a forwarding state that permits relaying information, or a blocking state that prohibits relaying information; and a ring protocol control unit for transmitting a first connection confirmation information generated by the network relay device and indicative of communications being possible between the first control port and the second control port from the first control port to the second control port at a first predetermined time interval, and transmitting a second connection confirmation information from the second control port to the first control port at a second predetermined time interval, and for, in an event that the first control port does not receive the second connection confirmation information from the another second control port, transmitting a first failure information indicative of communications being not possible from the first control port to the second control port, and, in an event that the second control port does not receive the first connection confirmation information from the first control port, transmitting a second failure information from the second control port to the first control port, wherein the ring protocol control unit transitions the first control port into the blocking state when the first control port receives the second failure information, and into the forwarding state when the first control port transmits the first failure information, and wherein the ring protocol control unit transitions the second control port into the blocking state when the second control port receives the first failure information, and into the forwarding state when the second control port transmits the second failure information;

wherein after a first predetermined period of time passing from a point of transmitting the first failure information from the first control port, the ring protocol control unit transitions the first control port, from which the first failure information has been transmitted, into the forwarding state, and wherein after a second period of time shorter than the first predetermined period of time passing from a point of receiving the first failure information in the second control port, the ring protocol control unit transitions the second control port, in which the first failure information has been received, into the blocking state;

wherein said transmitting the first failure information from the first control port to the second control port and said transmitting the second failure information from the second control port to the first control port includes, transmitting the first failure information and the second failure information via at least one another network relay device.

5. A network relay device to be used in a ring network, said network relay device comprising:

plurality of physical ports;

a first control port to be transitioned into either a forwarding state that permits relaying information, or a blocking state that prohibits relaying information; and a ring protocol control unit for transmitting a first connection confirmation information generated by the network relay device and indicative of communications being possible between the first control port and a second control port of another network relay device from the first control port to the second control port at a first predetermined time interval, and for, in an event that the first control port does not receive a second connection confirmation information, which is generated by the another network relay device and transmitted from the second control port to the first control port at a second predetermined time interval, transmitting a first failure information generated by the network relay device and indicative of communications being not possible from the first control port to the second control port, wherein the ring protocol control unit transitions the first control port into the blocking state when the first control port receives a second failure information, which is generated by the another network relay device and transmitted from the second control port to the first control port when the second control port does not receive the first connection confirmation information, and into the forwarding state when the first control port transmits the first failure information, and wherein after a first period of time passing from a point of transmitting the first failure information from the first control port, the ring protocol control unit transitions the first control port, from which the first failure information has been transmitted, into the forwarding state, and wherein after a second period of time shorter than the first period of time passing from a point of receiving the second failure information from the second control port in the first control port, the ring protocol control unit transitions the first control port, in which the second failure information has been received, into the blocking state;

wherein said transmitting the first failure information from the first control port to the second control port and the second failure information from the second control port to the first control port includes, transmitting the first failure information and the second failure information via at least one external network relay device.

6. A ring network comprising:

plural network relay devices connected in a ring shape, wherein the plural network relay devices comprise a first network relay device, the first network relay device comprises a first control port and a second control port:

wherein the first control port and the second control port to be transitioned into either a forwarding state that permits relaying information, or a blocking state that prohibits relaying information; and wherein the first network relay device comprises a ring protocol control unit for transmitting a first connection confirmation information generated by the first network relay device indicative of communications being possible between the first control port and the second control port from the first control port to the second control port at a first predetermined time interval, and for transmitting a second connection confirmation information generated by the first network relay device from the second control port to the first control port at a second predetermined time interval, and wherein, in the event that the first control port does not receive the second connection confirmation information, the ring protocol control unit transmits a first failure information indicative of communications being not possible between the first control port and the second control port, from the first control port to the second control port, and wherein, in the event that the second control port does not receive the first connection confirmation information, the ring protocol control unit transmits a second failure information from the second control port to the first control port, and wherein the ring protocol control unit transitions the first control port into the blocking state when the first control port receives the second failure information, and into the forwarding state when the first control port transmits the first failure information, and wherein the ring protocol control unit transitions the second control port into the blocking state when the second control port receives the first failure information, and into the forwarding state when the second control port transmits the second failure information;

wherein after a first predetermined period of time passing from a point of transmitting the first failure information from the first control port, the ring protocol control unit transitions the first control port, from which the first failure information has been transmitted, into the forwarding state, and wherein after a second period of time shorter than the first predetermined period of time passing from a point of receiving the first failure information in the second control port, the ring protocol control unit transitions the second control port, in which the first failure information has been received, into the blocking state;

wherein said transmitting the first failure information from the first control port to the second control port and the second failure information from the second control port to the first control port includes, transmitting the first failure information and the second failure information via at least one another network relay device.

7. The ring network according to claim 6, wherein the first network relay device further comprises a frame generation unit for generating the first connection confirmation information or the first failure information to be transmitted by the first control port, and for generating the second connection confirmation information or the second failure information to be transmitted by the second control port, wherein during the first control port receiving the second connection confirmation information or the second failure information, the ring protocol control unit causes the frame generation unit to generate the first connection confirmation information, and transmits the first connection confirmation information from the first control port, and wherein, when the first control port does not receive the second connection confirmation information and the second failure information, the ring protocol control unit causes the frame generation unit to generate the first failure information, and transmits the first failure information from the first control port, and wherein during the second control port receiving the first connection confirmation information or the first failure information, the ring protocol control unit causes the frame generation unit to generate the second connection confirmation information, and transmits the second connection confirmation information from the second control port, and wherein, when the second control port does not receive the first connection confirmation information and the first failure information, the ring protocol control unit causes the frame generation unit to generate the second failure information, and transmits the second failure information from the second control port.

8. The ring network according to claim 7, wherein the first network relay device further comprises a port control unit for transitioning the first control port into either the forwarding state or the blocking state, wherein the ring protocol control unit controls the port control unit to transition the first control port into either the forwarding state or the blocking state, and for transitioning the second control port into either the forwarding state or the blocking state, wherein the ring protocol control unit controls the port control unit to transition the second control port into either the forwarding state or the blocking state.

* * * * *